(12) United States Patent
Powell et al.

(10) Patent No.: US 11,955,618 B2
(45) Date of Patent: Apr. 9, 2024

(54) METAL-AIR BATTERY

(71) Applicant: Worcester Polytechnic Institute, Worcester, MA (US)

(72) Inventors: Adam C. Powell, Newton, MA (US); Hongyi Sun, Worcester, MA (US); Mahya Shahabi, Worcester, MA (US); Yu Zhong, Shrewsbury, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 17/696,142

(22) Filed: Mar. 16, 2022

(65) Prior Publication Data

US 2022/0302527 A1    Sep. 22, 2022

Related U.S. Application Data

(60) Provisional application No. 63/161,832, filed on Mar. 16, 2021.

(51) Int. Cl.
*H01M 12/06* (2006.01)
*H01M 4/38* (2006.01)
(Continued)

(52) U.S. Cl.
CPC .............. *H01M 12/06* (2013.01); *H01M 4/38* (2013.01); *H01M 4/9041* (2013.01); *H01M 4/905* (2013.01); *H01M 6/5022* (2013.01); *H01M 6/5038* (2013.01); *H01M 8/04701* (2013.01); *H01M 8/04753* (2013.01);
(Continued)

(58) Field of Classification Search
None
See application file for complete search history.

(56) References Cited

U.S. PATENT DOCUMENTS

| 5,208,526 A | * | 5/1993 | Goldman | ............... | H01M 12/06 |
| | | | | | 320/DIG. 34 |
| 2013/0059213 A1 | * | 3/2013 | Tomita | ................ | H01M 8/0245 |
| | | | | | 429/405 |

(Continued)

FOREIGN PATENT DOCUMENTS

| CN | 110380159 A | 10/2019 |
| KR | 1020180050431 A | 5/2018 |

(Continued)

OTHER PUBLICATIONS

International Search Report, PCT/US2022/020514, dated Jun. 24, 2022, pp. 1-5.

*Primary Examiner* — Ula C Ruddock
*Assistant Examiner* — Mary Grace Byram
(74) *Attorney, Agent, or Firm* — Armis IP Law, LLC

(57) ABSTRACT

A metal-air battery and methods for generating electricity in a metal-air battery are described herein. The battery and the method includes heating an anhydrous salt to obtain a molten salt electrolyte; contacting the molten salt electrolyte to at least one cathode communicating with air; reducing air at the cathode to obtain oxygen ions for diffusing through the molten salt electrolyte; oxidizing at least one metal anode by the oxygen ions in the electrolyte thereby generating electricity and forming a metal anode oxide; and cooling at least one section of the metal-air battery for precipitating the metal anode oxide.

11 Claims, 8 Drawing Sheets

(51) Int. Cl.
  *H01M 4/90*      (2006.01)
  *H01M 6/50*      (2006.01)
  *H01M 8/04701*   (2016.01)
  *H01M 8/04746*   (2016.01)
  *H01M 12/08*     (2006.01)
  *H01M 50/431*    (2021.01)
  *H01M 4/02*      (2006.01)
  *H01M 4/86*      (2006.01)

(52) U.S. Cl.
  CPC ......... *H01M 12/08* (2013.01); *H01M 50/431* (2021.01); *H01M 2004/027* (2013.01); *H01M 2004/8689* (2013.01); *H01M 2300/0048* (2013.01); *H01M 2300/0054* (2013.01); *H01M 2300/0057* (2013.01)

(56) References Cited

U.S. PATENT DOCUMENTS

2016/0028133 A1* 1/2016 Miles ................... H01M 12/02
                                                  429/405
2016/0186334 A1  6/2016 Murahara
2017/0214106 A1* 7/2017 Johnson .............. H01M 10/399

FOREIGN PATENT DOCUMENTS

KR     1020180104078 A   9/2018
WO        2019069139 A1  4/2019

* cited by examiner

METAL-AIR BATTERY

RELATED APPLICATIONS

This application claims the benefit of priority to U.S. provisional application No. 63/161,832 filed Mar. 16, 2021, having the title, "Metal-Air Fuel Cell" by inventors, Adam C. Powell and Hongyi Sun, which is hereby incorporated by reference herein in its entirety.

BACKGROUND

Climate change makes imperative the reduction, elimination, or reversal of greenhouse gas emissions. Long-haul shipping and land travel of more than 500 kms are difficult industries to decarbonize because cost-effective travel over such distances requires energy storage with high energy density and specific energy. Human civilization has built these systems around the lowest-cost fossil fuels, in particular coal and low-quality "bunker fuel". The industry uses about 200 million tons of this fuel per year and emits 700 million tons of $CO_2$.

Rechargeable batteries using lithium are standard for devices such as mobile phones, and electric vehicles. Magnesium, aluminum, zinc and calcium ion batteries have their various advantageous factors. However, the intercalation cathodes for example, $LiMnO_2$ and anodes for example, $LiC_6$ which facilitate reversibility and recharging result in much lower voltage and energy density compared to the voltage and energy density produced by oxidation, as shown by the difference between "Li" and "Li Battery" points in FIG. 1.

Efficient direct recovery of electrical energy from most metal oxidation enthalpy in a battery or a battery is challenging for four primary reasons. First, metal oxidation forms a passivating oxide film, or in aqueous electrolytes a hydroxide film, which slows or stops the reaction. Second, reactive metals with the highest energy per ion such as Li, Ca, Mg and Al undergo a parasitic reaction with aqueous electrolytes to form hydrogen. Third, the oxygen reduction reaction at temperatures below about 200° C. generally requires precious and expensive metal catalysts such as platinum or palladium. Fourth, it is necessary to remove the oxidation product from the electrolyte.

Therefore, there is a need for a metal oxidation fuel cell or a battery in which hydroxide film is not formed, the reactive metals do not undergo a parasitic reaction with aqueous electrolytes to form oxygen, and the oxygen reduction reaction does not require precious metal catalysts. Further, there is a need for a metal oxidation fuel cell or a battery that reduces or eliminates greenhouse gas emissions in long haul transportations.

SUMMARY

An aspect of the invention described herein provides a method for generating electricity in a metal-air battery, the method including: heating an anhydrous salt to obtain a molten salt electrolyte; contacting the molten salt electrolyte to at least one cathode, the cathode communicating with air; reducing oxygen from air at the porous cathode to obtain oxygen ions for diffusing into the molten salt electrolyte; oxidizing at least one metal anode by the oxygen ions in the electrolyte to obtain positive ions of the metal thereby generating electricity, and forming a dissolved metal oxide; and cooling at least one section of the metal-air battery for precipitating the metal anode oxide.

An embodiment of the method further includes pumping air through the cathode. An embodiment of the method, further includes prior to pumping, drying air with at least one selected from: a dryer, a heat exchanger, and a dehumidifier. In an embodiment of the method, communicating further includes controlling flow of air to the cathode.

An embodiment of the method further includes displacing the anode and the cathode to accommodate the metal anode oxide by at least one technique selected from: slanting, rotating, lifting, and twisting. An embodiment of the method further includes insulating the battery. An embodiment of the method further includes, connecting electric conductors to the cathode and the anode for harvesting electricity. An embodiment of the method further includes regenerating the metal anode. For example, the metal anode is regenerated by providing a negative charge to reduce metal ions thereby producing the metal, while providing a negative charge to the cathode to oxidize $O^{2-}$ ions thereby generating oxygen gas.

In an embodiment of the method, regenerating the metal anode further includes removing the cathode and the anode from the molten salt electrolyte, inserting at least one small electrode in the molten salt electrolyte for reducing multipolar metal oxide, and depositing metal on the electrode. An embodiment of the method further includes maintaining a temperature of the battery, such that the temperature is more than a eutectic temperature of the molten salt electrolyte and is less than a melting temperature of the anode. The temperature of the battery is maintained by controllers and control mechanisms available in the art for example sensors, electro-mechanical systems, thermistors, etc. An embodiment of the method further includes separating the anode and the cathode by insulating separators, for example metal sheets thereby maintaining distance between the anode and the cathode.

An aspect of the invention described herein provides a metal-air battery including at least one metal anode, at least one cathode, and a molten salt electrolyte, the anode and the cathode being suspended in the molten salt electrolyte and capable of movement in at least one direction.

An embodiment of the metal-air battery further includes at least one of: a heat exchanger, an insulated container, an air supply, an air dryer, electric conductors, an air pump, a dehumidifier, and a motor. An embodiment of the metal-air battery further includes a separator to maintain distance between the cathode and the anode.

In an embodiment of the battery, the anode is at least one selected from: magnesium, aluminum, silicon, boron, beryllium, calcium, zinc, and iron. In an embodiment of the battery, the cathode is at least one selected from: nickel, and titanium. In another embodiment of the battery, the separator is a titanium sheet or an iron sheet.

In an embodiment of the battery, the molten salt electrolyte is at least one selected from: NaCl, KCl, $MgCl_2$, $CaCl_2$, LiCl, $SrCl_2$, LiF, NaF, KF, $MgF_2$, AlCl3, ZnCl2, FeCl2, FeCl3, and $CaF_2$. An embodiment of the battery further includes a cooling device that reduces temperature of at least one section of the battery. In an embodiment of the battery the anode further includes at least one metal selected from: 10% nickel, 10% chromium, 5% aluminum, and 20% titanium.

BRIEF DESCRIPTION OF DRAWINGS

FIG. 4A shows a thin layer of cool and solid MgO, vertically stacked electrodes, and thick Mg anodes. FIG. 4B shows thin Mg anodes and thick growing layer of cool and solid MgO at the bottom of the cell. To accommodate the growing MgO the electrodes rotate or slant in one-direction or multi-directions.

DETAILED DESCRIPTION

A molten salt electrolyte metal-air battery is described herein. The metal-air battery includes a molten salt electrolyte with the fuel metal as the anode and nickel cathode. The electrode configuration is novel and includes a novel method for oxide removal. The metal-air battery is compact and is capable of storing up to 125 MWh in a single 20-foot shipping container. In contrast, a state-of-the-art lithium battery container stores only about 3 MWh.

The anhydrous molten salt electrolyte as described herein eliminates hydrogen production, has sufficient metal oxide solubility to avoid oxide film formation; and is maintained at high temperature therefor precious metal catalysts are not required. The most common cathode material in related molten carbonate electrolyte fuel cells is nickel, which is oxidized in situ to form a stable NiO thin film on its surface. One of the methods to remove the anode metal oxide reaction product from the electrolyte is by filtration.

Figure 1:
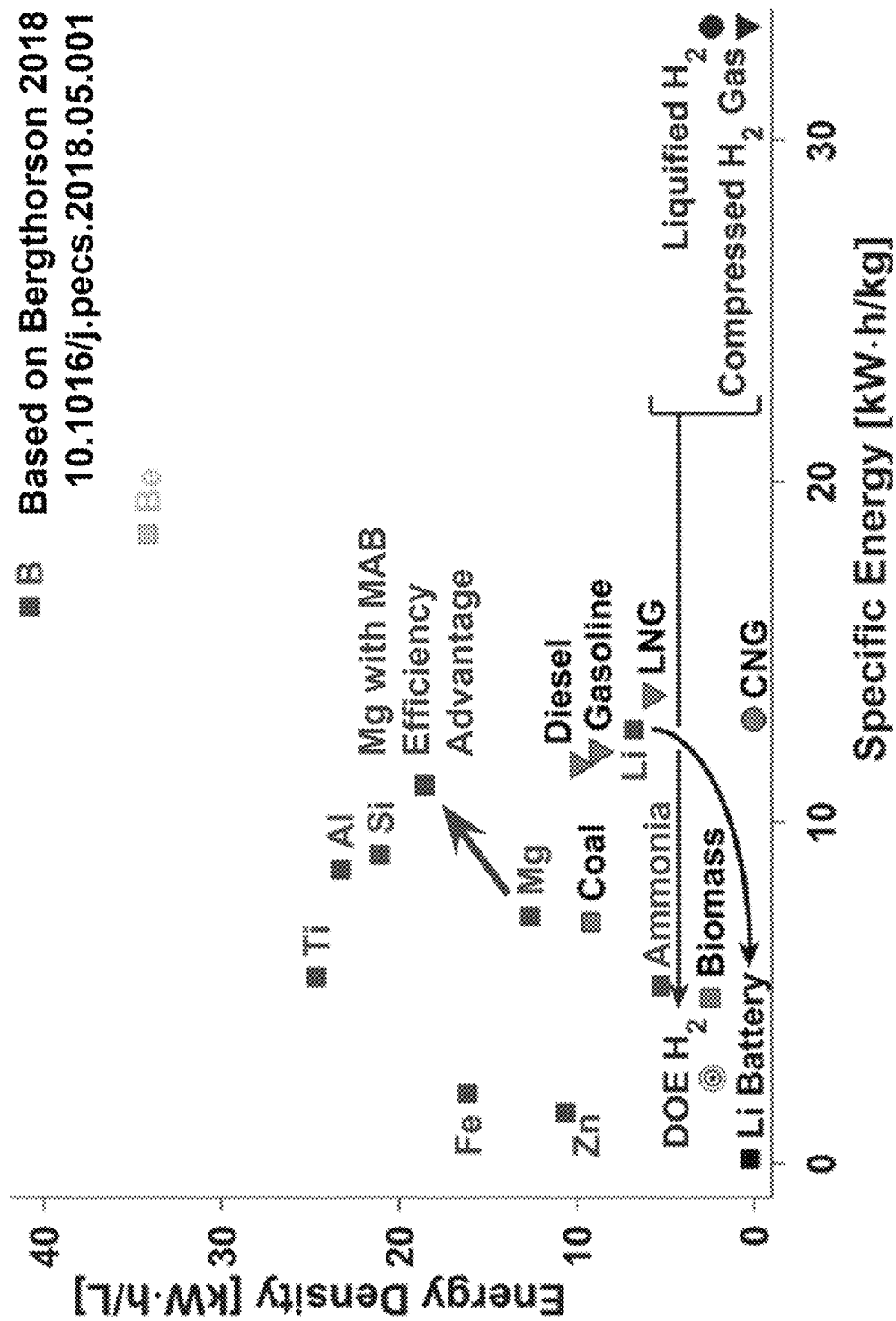
FIG. 1 is a scatter plot showing energy density and specific energy of select energy storage materials including hydrocarbon fuels and metals.
Figure 2:
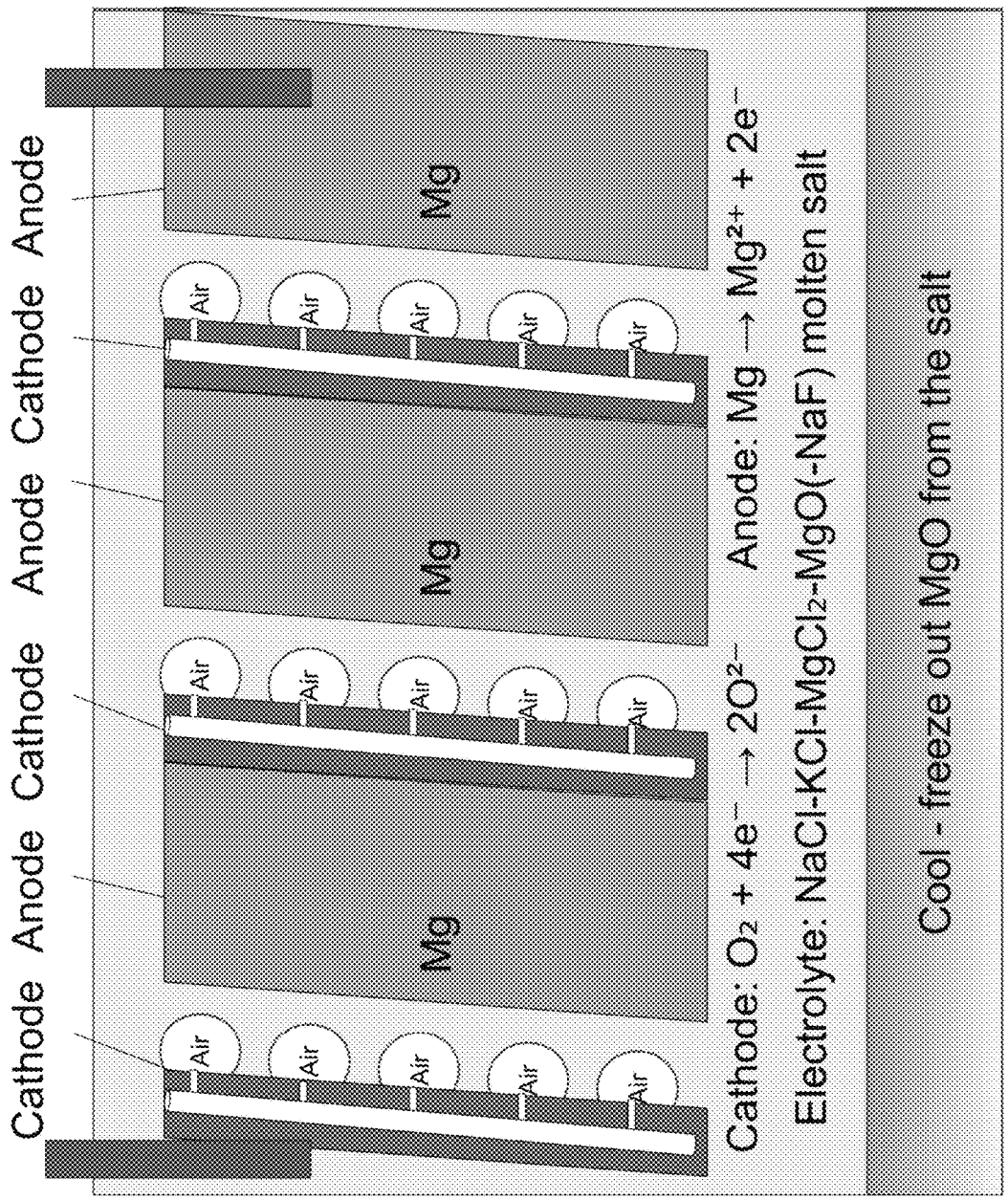
FIG. 2 is a schematic drawing of a cross section of an embodiment of a metal air battery.

In the metal air battery as described herein, air is injected into the cathode, and travels through the cathode. The cathode contains pores in which the oxygen is reduced to $O^{2-}$ ions in the molten salt. The cathode is slanted as shown in FIG. 2 to minimize interaction between air bubbles and the anode fuel metal, with an angle between 2° and 80°, or between 5° and 70°. In some embodiments, multiple anodes and cathodes exist in a single molten salt bath to increase the battery voltage and reduce the fraction of energy lost through the end electrodes (FIG. 2).

In some embodiments of the metal-air battery, the metal oxide reaction product, for example, MgO is removed from the molten salt electrolyte by solidification from a cooled side of the cell, for example from the bottom of the cell. In some embodiments, the metal oxide reaction product is removed from the molten salt electrolyte by filtering particles from the salt. In some embodiments, the filter includes powdered metals such as titanium, or metal oxide such as zirconia.

In some embodiments, one or more insulating separators are attached to the cathode, which are not soluble in the molten salt, and keep the anode and cathode a roughly fixed distance apart. In some embodiments, the separators are vertical plates approximately perpendicular to the cathodes. In some embodiments, the separators are wider at the top compared to the bottom, such that the larger density of bubbles near the top does not lead to reaction with the anodes. In some embodiments they include boron nitride, or silicon carbide, or aluminum oxide, or titanium oxide, or zirconium oxide.

In some embodiments, magnesium is the metal fuel and anode material. In alternative embodiments, the metal anode is aluminum, or silicon, or boron, or beryllium, or calcium, or zinc, or iron. In some embodiments, the cathode is porous nickel or titanium, which may partially oxidize in situ. In some embodiments, a metal sheet, for example a titanium sheet or an iron sheet is placed between the anode and cathode to prevent reaction between the anode and cathode metals.

In the embodiment of the battery illustrated in FIG. 2, the molten salt electrolyte includes molten chloride salts, for example, NaCl, KCl, $MgCl_2$, and the oxide of the fuel metal, for example, MgO. In some embodiments, the molten salt electrolyte includes other chlorides such as $CaCl_2$), LiCl, $SrCl_2$, and/or fluoride salts, such as LiF, NaF, KF, $MgF_2$ or $CaF_2$. The advantage of fluoride salts is that the solubility of the anode metal oxide is higher, and the volatility of the salt is lower. However, the disadvantage of fluoride salts is that the cathode or the container may corrode faster.

In some embodiments, a section or a portion of the battery is cooler than the molten salt. For example, the section is a side, or a bottom of the battery is cooler than the molten salt. A section of the battery is cooled to solidify the battery reaction product, for example MgO. In some embodiments the portion is actively cooled. Active cooling involves doing mechanical work to drive flow of air or water to cool it, for example by a fan or pump. In alternative embodiments, the portion of the battery is passively cooled and doesn't require a fan or pump. The cooling of a part of the battery removes a portion of the heat generated by the reactions or the electrical heating by the current.

Temperature is maintained independently at multiple points across the surface of the battery, to control the shape of the solidified oxide. For example, if the oxide is frozen on the bottom of the cell, then more cooling is applied to the center, less to the sides, and still less to the corners, in order to maintain a roughly planar oxide-salt interface and minimize interference with the electrodes. Cooling is applied in multiple ways, for example by moving or rotating insulation in order to allow passive cooling by natural convection with external air, or fans which would apply active cooling by forced air convection, or water or other liquid cooling circuits which absorb heat from the battery and dissipate it at a heat exchanger.

Figure 3:
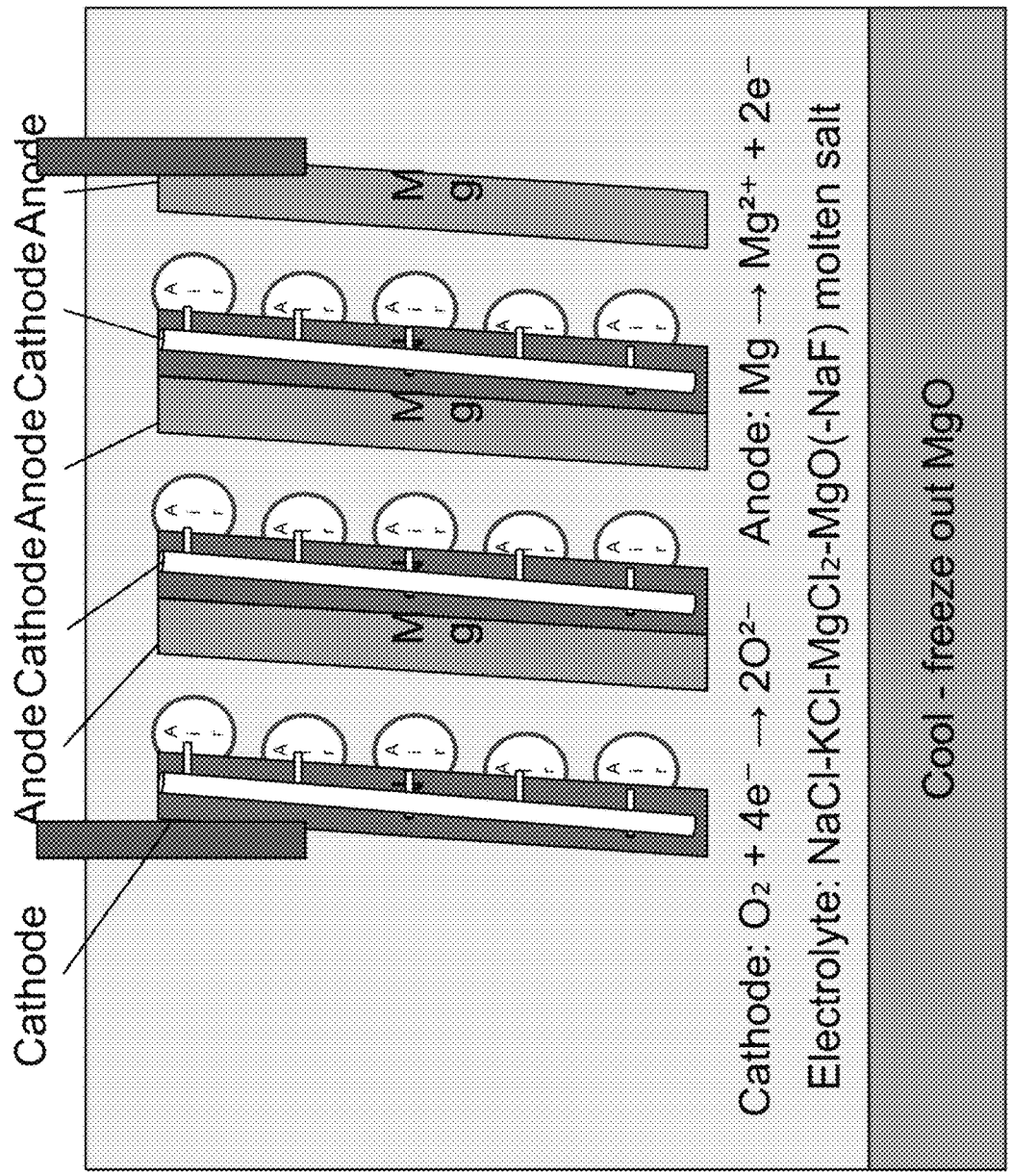
FIG. 3 is a schematic drawing of a cross section of an embodiment of a metal air battery containing stack of sliding electrodes.
Figure 4A:
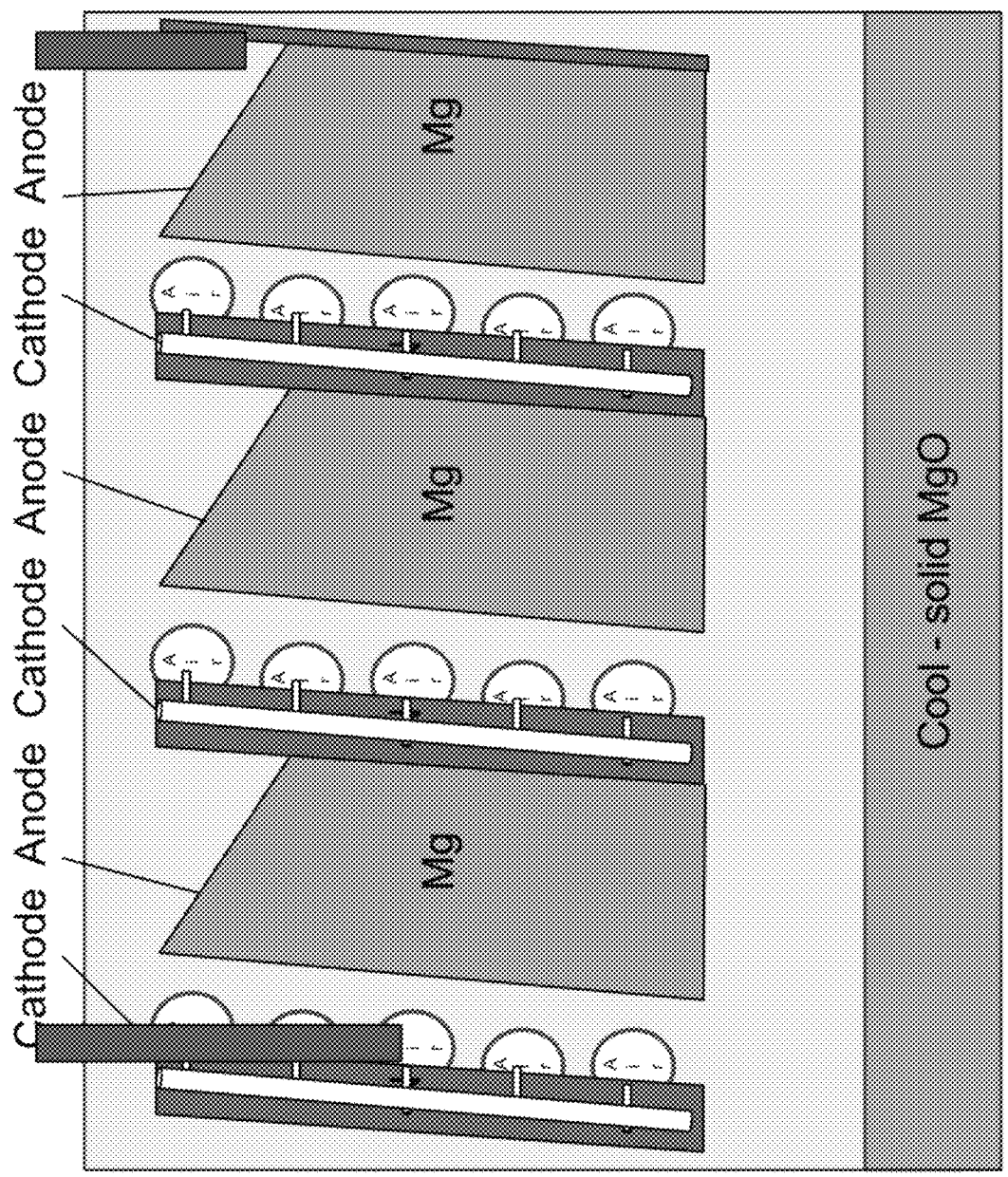
FIG. 4A-FIG. 4B is a set of schematic drawing of a cross section of an embodiment of a metal air battery or containing rotating electrodes.
Figure 4B:
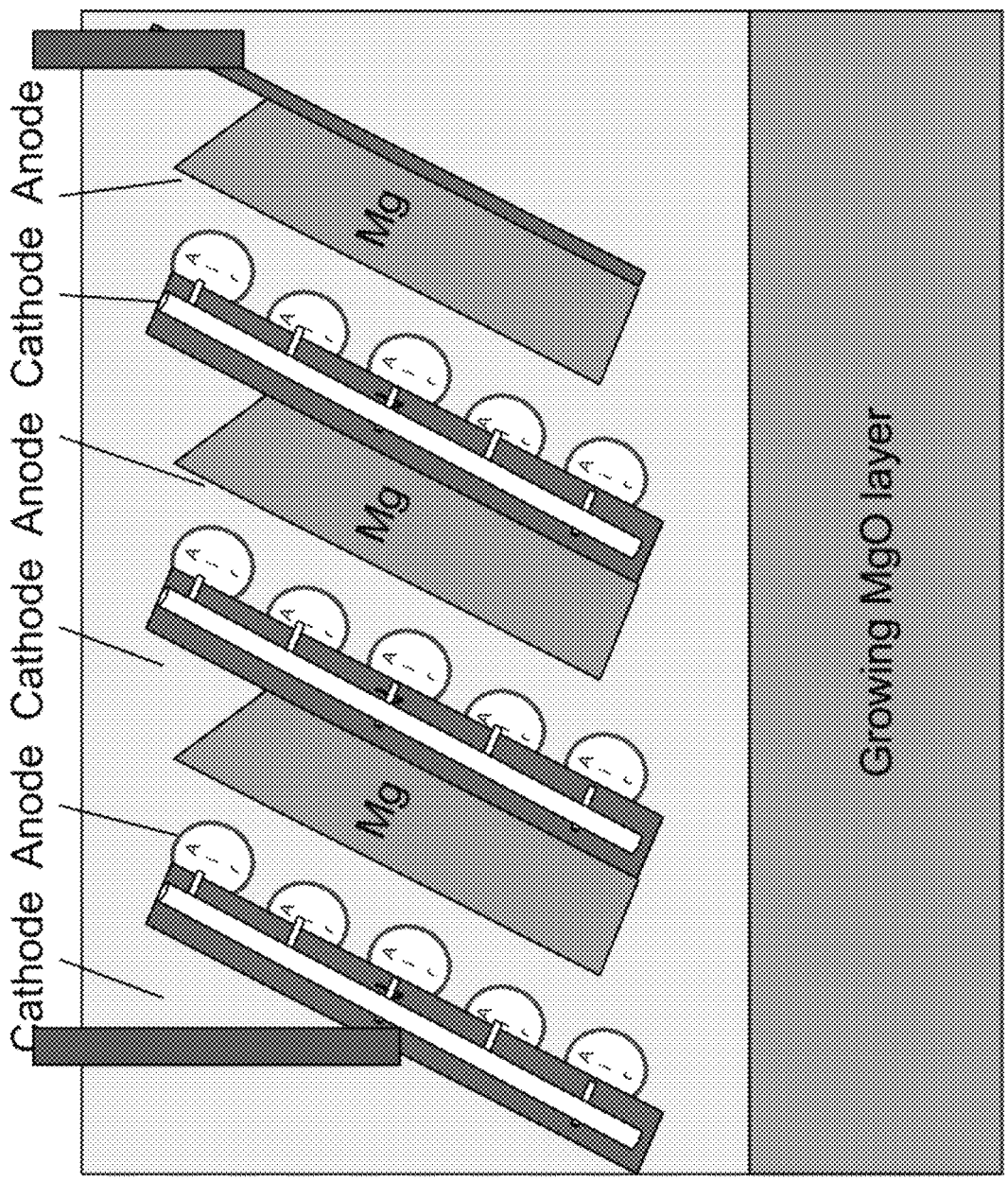

In some embodiments, as the anode metal is consumed, for example, magnesium, the anode or cathode slides horizontally or vertically in order to maintain approximately constant anode-cathode distance, as shown in FIG. 3. The distance between cathode and anode is maintained within 20% of each other. In other embodiments, as the anode metal is consumed, for example, magnesium, the anode and cathode pivot and rotate upward to increase their off-vertical angle as shown in FIG. 4B, thereby maintaining approximately constant anode-cathode distance. Further, the upward rotation of the anodes and cathodes creates space for solidifying anode metal oxide reaction product at the bottom part of the cell. In some embodiments, the rotation is a result of anode metal buoyancy in the molten salt, for example magnesium metal has lower density than any of the salts such as NaCl, KCl, $MgCl_2$. The angle of the terminal cathode (on the left in FIG. 4B) is adjusted such that the anode and cathode, or all anodes and cathodes if there are more than one of each, rotate together. In some embodiments, as the anode metal (illustratively magnesium) is consumed, the anode and cathode both rotate, and slide together, to maintain approximately constant anode-cathode distance. The combination of the electrodes sliding and rotating result in higher overlapping area between the anode and cathode compared to rotating alone.

In some embodiments, thermal insulation around the sides and the top of the battery reduces heat loss to the environment. In some embodiments, at least one heat exchanger recovers some of the heat from exiting air, by heating incoming air. In some embodiments, an air dryer removes some or all moisture in the incoming air to prevent hydrogen formation and accelerated corrosion of the electrodes.

In some embodiments of the battery, the operating temperature is maintained between the eutectic temperature of the molten salt electrolyte, and the melting point of the metal anode. For example, the eutectic temperature of a salt electrolyte mixture of $NaCl$—$KCl$—$MgCl_2$ is just below 400° C., and the eutectic temperature of salt electrolyte mixture of $NaCl$—$CaCl_2$—$MgCl_2$ is about 430° C., which provides or defines the lower temperature bound or lower level or lower limit. The melting point of magnesium is 650° C. and the melting point of aluminum is 660° C. which defines the upper bound or upper level or upper limit for magnesium and aluminum. The melting points of calcium, beryllium and iron are 842° C., 1287° C. and 1550° C. respectively, therefore, the upper limiting temperature for those metals are determined by molten salt electrolyte volatility.

Gas Handling

In some embodiments, the battery includes gas handling systems, including heat exchangers. For example, the gas handling system is a tube-and-shell heat exchangers, in which the tubes remove the exhaust because it relatively easier to remove debris such as condensed salt fumes from the tubes). In some embodiments, a drill operates occasionally to drive salt collected in the tubes of the heat exchanger back into the main molten salt bath. In some embodiments, the heat exchanger includes pumps or compressors to drive air down into the cathodes. In some embodiments, the battery includes a dehumidification system to prevent formation of corrosive or unhealthy gasses by reaction between water and molten salt electrolyte, for example HCl can be produced if the electrolyte is a chloride salt. Dehumidification may be centralized (i.e. outside of the battery container), and is helpful because it reduces the tendency for HCl formation and corrosion.

Control of Bottom Heat Transfer and MgO Growth

In some embodiments, the battery includes a multi-zone heating/cooling control in the bottom portion of the fuel cell. Therefore, precise control of temperature and thermal gradient throughout the floor is achieved, which results in a dense MgO layer at the bottom part of the battery which rejects molten salt and ensured that there is plenty of open room for electrodes in the salt. The multi-zone heating and cooling is achieved by small zone fans, opening or closing barriers to gas motion, and heaters.

Magnesium Anode Regeneration

The metal-air battery cannot be directly recharged by simply switching electrode polarity. In some embodiments, the metal oxide from the discharged battery is converted to metal for new battery anodes in situ, thereby indirectly recharging the battery.

In some embodiments, "recharging" electrode plates are inserted each with an inert anode on one side and a magnesium plating cathode on the other side, into the same molten salt bath, and illustratively in the same container, which holds the battery. Similar to the battery electrodes, the recharging anode-cathode pairs connect in series within a single molten salt electrolyte bath. Appropriate amount of electrical potential is applied to the electrodes at the end (which is at least the reduction potential times the number of electrode pairs; reduction potential is given by reaction free energy $\Delta G/nF$, i.e. about 2.5-2.6 V for Mg at 500° C.) which results in migration of current through all the plates, creating magnesium metal at the cathode surfaces, and oxygen gas at the anode surfaces. Similar to the battery electrodes, these recharging anode-cathode pairs are slanted at an angle of about 5° to about 80° so oxygen bubbles rise against the underneath surface of the anode, minimizing contact between the bubbles and the growing solid magnesium cathode.

The regeneration operation takes place at a temperature of about 400 to about 650° C., in a similar bath temperature range to battery operation. The current generates heat in the bath. However, unlike battery operation, during the recharging step the bottom of the cell is thermally insulated so MgO dissolves into the molten salt as the dissolved $Mg^{2+}$ and $O^{2-}$ ions in the bath turn into Mg metal and $O_2$ gas at the electrodes.

In some embodiments, the potential applied to the end plates periodically reverses direction, so the magnesium cathodes become anodic and inert anode becomes cathodic. The reversing of the potential converts a small amount of $O_2$ gas to $O^{2-}$ ions, and a small amount of Mg metal to $Mg^{2+}$ ions in the bath. The Mg metal dissolution preferentially occurs at protrusions, such as the roughness which normally forms during plating. In some embodiments, the reverse potential is applied during 1-10% of the time of forward potential application, resulting in current density of equal magnitude and opposite direction to the forward charging or plating current density. In some embodiments, the reverse current density is 10% to 1000% of the forward current density. This decreases the current or Faraday efficiency of the cell, but by reducing or eliminating magnesium surface roughness, it prevents salt trapping in the metal, and forestalls premature short-circuiting of each cell.

In some embodiments, the inert anode surface comprises at least 10% nickel, or 10% chromium, or 5% aluminum, or 20% titanium.

Due to low oxide solubility in the molten chloride bath, current density is expected to be low, around 0.1 $A/cm^2$. However, 50-200 plates are inserted into the container to form a large multipolar electrolysis cell, resulting in large area and productivity, and high efficiency. If the cell discharges at 0.5 $A/cm^2$ with ten anode-cathode pairs, and recharges at 0.1 $A/cm^2$, then having 50 anode-cathode pairs in the recharging operation results in comparable charging and discharging rates, and a similar number of batteries charging at ports as discharging in operation.

The recharging operation produces magnesium metal from MgO at high efficiency. The recharging operation need not be performed on a discharged battery. In some embodiments, MgO raw material is fed into the bath to create a primary Mg production cell using the recharging operation method described herein.

In some embodiments, after recharging operation, the electrodes with Mg metal are removed, moved over a mold, heated to 660° C. or above to melt the Mg, and cast the Mg into new shapes, for example, the shapes required to make new battery anodes. In some embodiments, the mold includes a steel sheet insert as the battery anode plate. In some embodiments, the steel sheet insert is held against the mold wall by applying vacuum. In some embodiments, the mold is cooled from the bottom to promote directional solidification and to eliminate shrinkage voids.

The inventions described herein are the most practical methods. It is recognized, however, that departures may be made within the scope of the invention and that modifications will occur to a person skilled in the art. With respect to the above description then, it is to be realized that the optimum dimensional relationships for the parts of the invention, to include variations in size, materials, shape, form, function, steps, and manner of operation, assembly and use, would be apparent to one skilled in the art, and all equivalent relationships to those illustrated in the drawings and described in the specification are intended to be encompassed by, the present inventions.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Such equivalents are within the scope of the present invention and claims. The contents of all references including issued patents and published patent applications cited in this application are hereby incorporated by reference.

The invention now having been fully described, it is further exemplified by the following examples and claims.

Example 1: Metal-Air Battery Having a Mixture of NaCl—CaCl$_2$—MgCl$_2$—MgO as Molten Salt Electrolyte In a 20-foot shipping container battery stack design, with internal dimensions 5.89×2.35×2.36 m, ten anode-cathode pairs are arranged in series as shown in FIG. 2. The anode metal is magnesium, the cathode is partially oxidized porous nickel, and the molten salt is anhydrous NaCl—CaCl$_2$—MgCl$_2$—MgO. Anode dimensions are 2 m wide×1.5 m deep×45 cm thick. Cathodes are a total of 4 cm thick including a titanium plate against the next anode. The anode-cathode distance is 1 cm. Total length of the ten anode-cathode pairs is thus 5 m, though with a slight slant of about 7°, it is 5.2 m. Temperature in the anodes, cathodes, and molten salt between them is maintained at about 520-580° C.

Magnesium oxide enthalpy of formation $\Delta H_f$ is 601 kJ/mol, i.e. 6.87 kWh/kg. At 550° C., free energy of formation $\Delta G$ is 542 kJ/mol, this corresponds to an open circuit voltage of $\Delta G \div nF = 2.59$ V. Ionic conductivity of the molten salt is 2.14 S/cm, such that with 1 cm anode-cathode distance, electrolyte resistance-area product is 0.47 Ω·cm$^2$. Based on electrolyte resistance alone, short-circuit current density is calculated to be 2.59 V÷0.47 Ω·cm$^2$=5.54 A/cm$^2$. Conservatively using half the anode-cathode distance as boundary layer thickness, anode and cathode limiting current densities are estimated at 77 A/cm$^2$ and 3.1 A/cm$^2$ respectively. Therefore, the anode-cathode distance results in a maximum short-circuit current density just below the cathode limiting current, which is between 3.03 and 3.1 A/cm$^2$.

Figure 5:
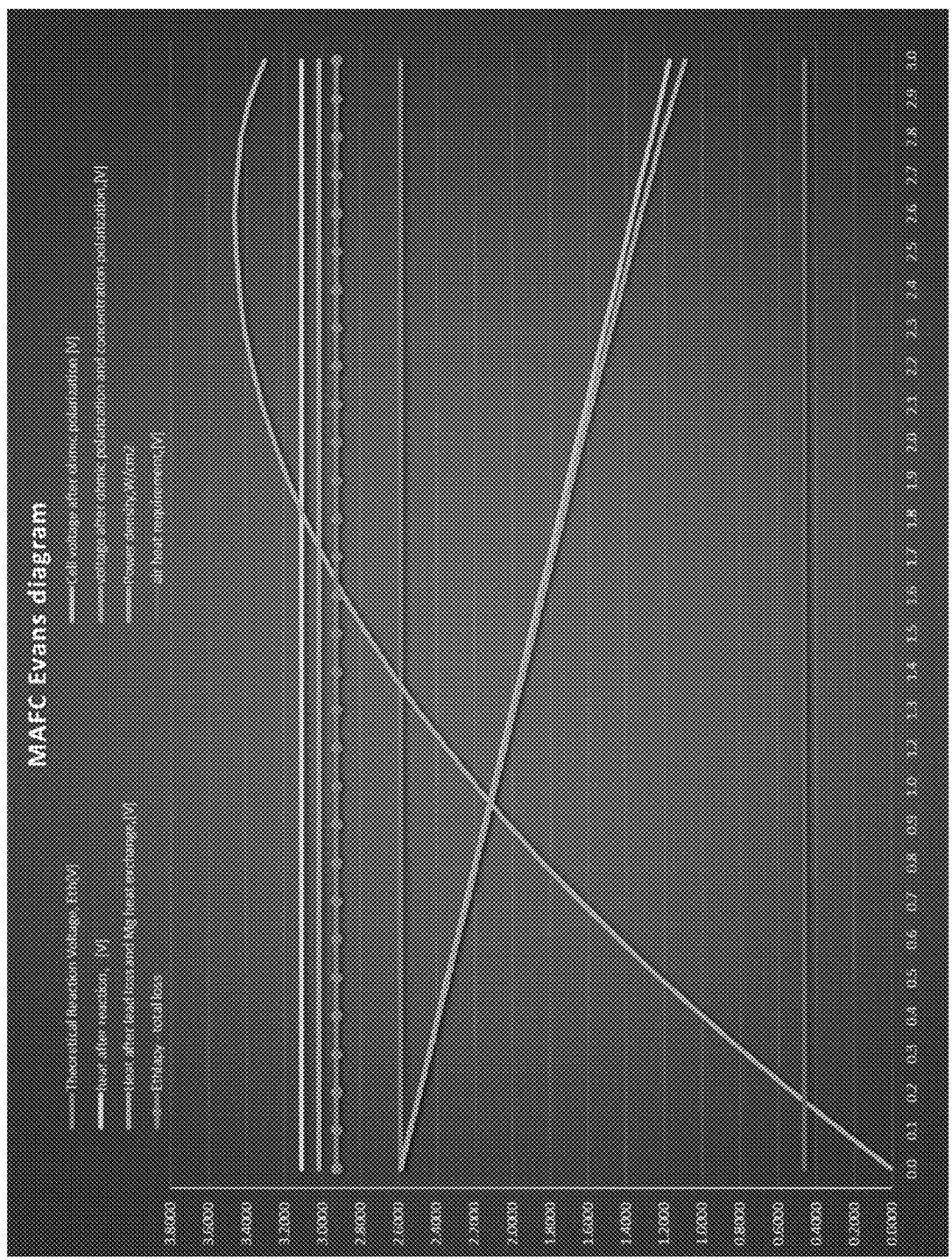
FIG. 5 is an Evans diagram showing modeled performance of 20-foot container magnesium-air stack in which the open circuit voltage $\Delta G/nF$ (dark blue), minus electrolyte ohmic resistance (light grey), further subtracting anode and cathode resistances (light blue); power density (orange); total reaction enthalpy per coulomb of charge $\Delta H/nF$ (yellow), minus lead losses (green), and minus air heating with 90% heat recovery (light brown).

FIG. 5 shows the resulting modeled voltage and power density vs. current density. Maximum power density is estimated at 3.5 W/cm$^2$ at 2.6 A/cm$^2$ current density, but efficiency is only 42% (ratio of the red voltage curve to the black enthalpy line). At 0.2 A/cm$^2$ current density, power density is 0.5 W/cm$^2$, and efficiency is 80%. In the full containerized battery stack with 10 anode-cathode pairs, these two current densities correspond to 1.05 MW and 150 kW respectively, and energy available is 65 MWh and 125 MWh respectively. This model assumes perfect current efficiency and oxide solubility.

Figure 6:
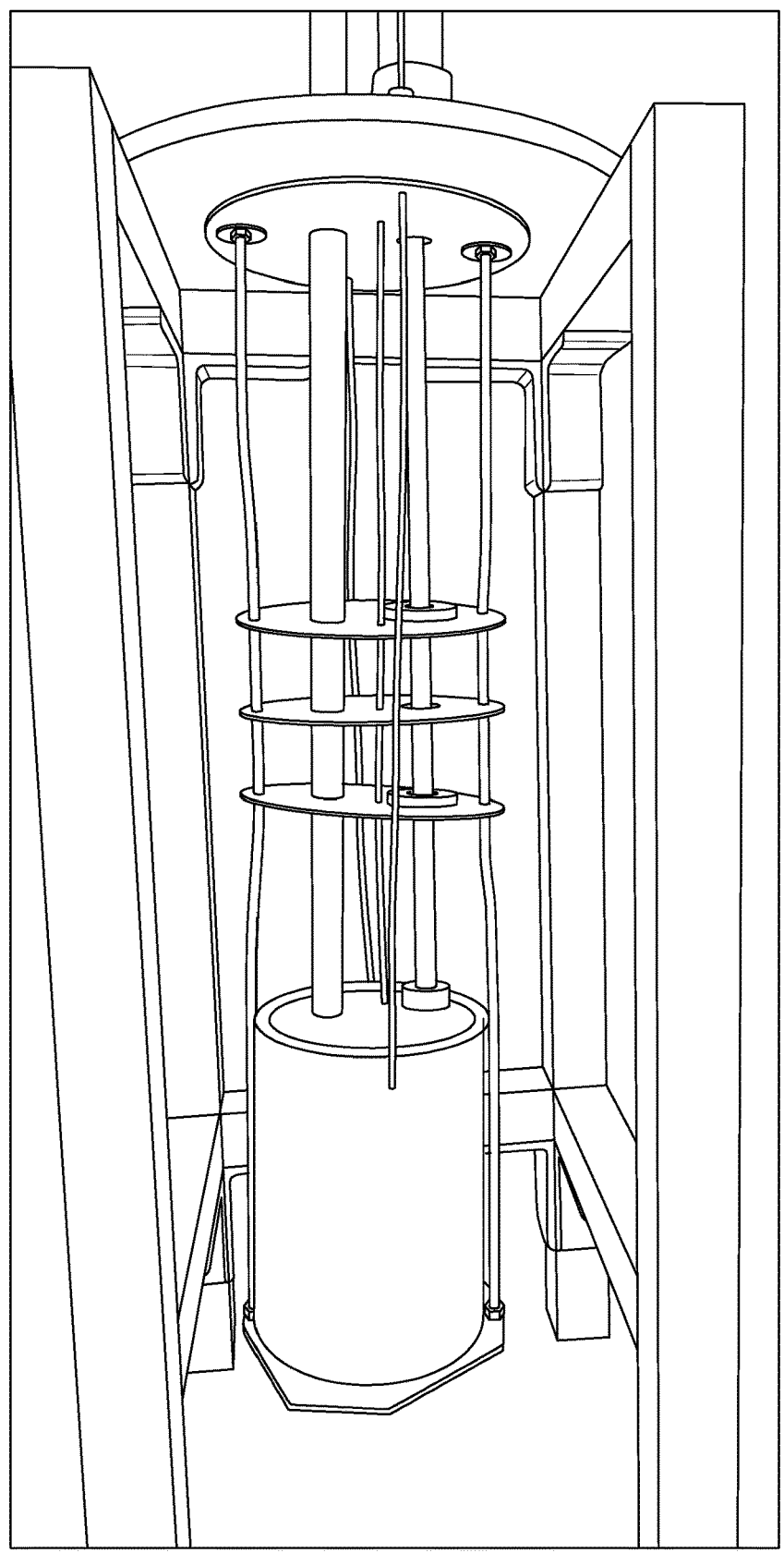
FIG. 6 is a photograph of an apparatus for magnesium-air battery showing a graphite crucible, with a magnesium anode on the end of a stainless rod (right), and stainless tube with nickel foam cathode (left).

Example 2: Metal-Air Battery Having NaCl—KCl—MgCl$_2$ as the Molten Salt Electrolyte The performance of a battery was measured. The battery contained a magnesium anode, porous nickel mesh cathode at the end of a stainless steel tube, and NaCl—KCl—MgCl$_2$ eutectic molten salt electrolyte, as shown in FIG. 6. The apparatus was heated with argon gas to prevent excessive oxidation of the components. Upon reaching a temperature of 550° C., compressed air was pumped through 1 cm$^2$ cathode. A voltmeter recorded the open circuit voltage, then a voltmeter and ammeter recorded voltage and current as a potentiometer varied the resistance from 0 to 25Ω.

Figure 7:
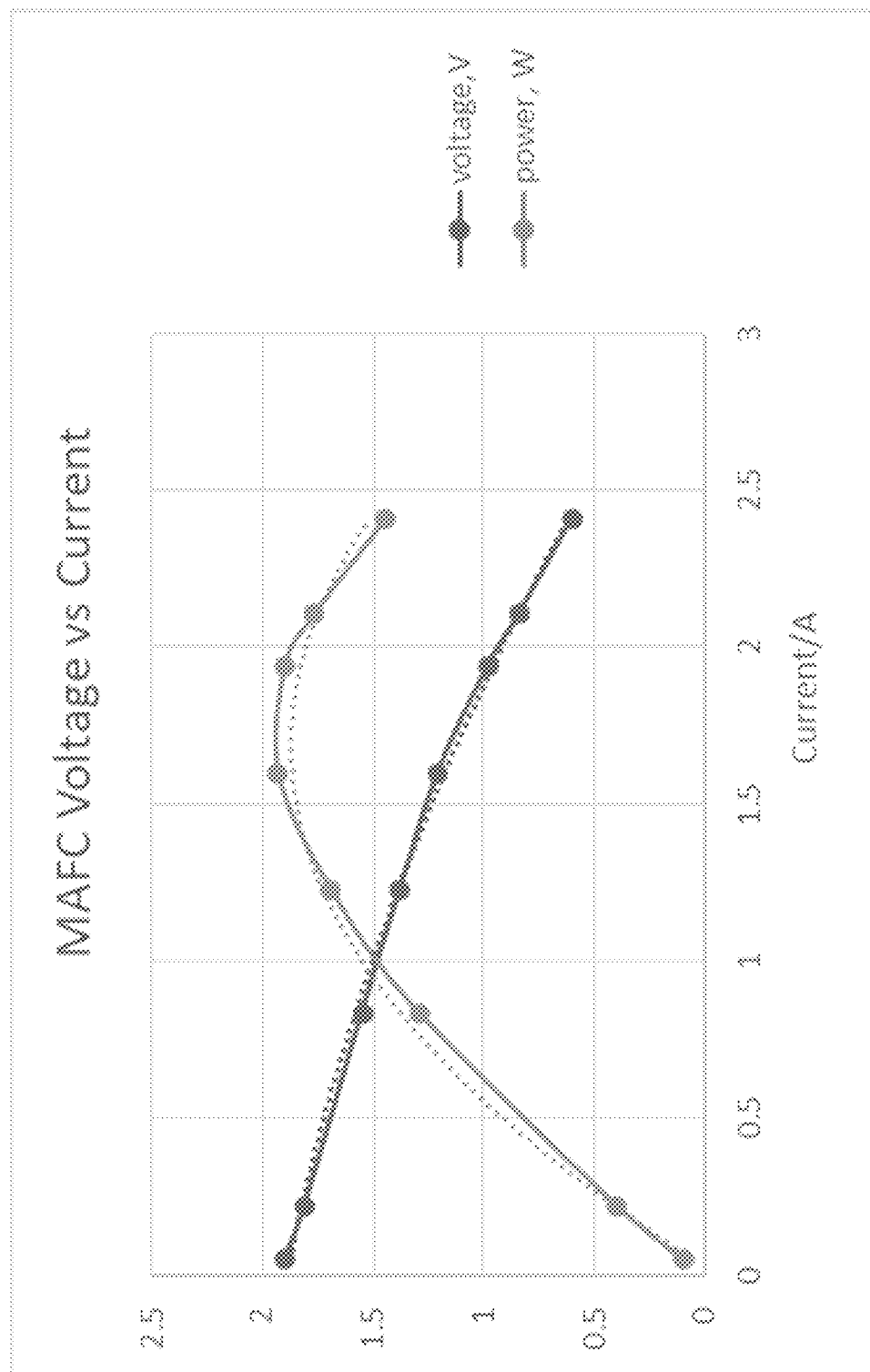
FIG. 7 is a graph showing measured voltage-current and power-current curves from the apparatus of FIG. 6.

FIG. 7 shows measured voltage-current and power-current curves. Open circuit voltage was 1.9 V, i.e. 73% of the model prediction. This is likely because of the presence of oxide impurities in the system which reduce the solubility of MgO in the molten salt. Maximum current was greater than the predicted 3.1 A/cm$^2$, likely because the oxygen reduction reaction proceeds as bubbles rise along the stainless tube. Maximum power was observed to be just below 2 W.

Example 3: Metal-Air Battery Life Cycle

A cooling control apparatus is installed at the bottom part of the container which is lined with insulation. Braces for electrodes and the top gas control system are installed. Liquid magnesium anodes are cast containing steel sheet cathode contacts as inserts. Nickel cathodes are attached to Mg-steel castings and electrode bracing system (a horizontal bar in its simplest form).

Molten salt electrolyte is poured into the container at maximum service temperature at around 620° C. Magnesium anode/nickel cathode system is inserted including air connections to cathodes. The container electrical leads are attached to the end anode and the end cathode. The top gas control and heat exchanger system is installed by attaching to the gas control to cathode air supply connections. The top of the container is closed.

The battery is then installed in the ship or stationary storage circuit and allowed to discharge. The discharging process is started before the salt cools below the minimum service temperature of about 420° C. Depending on amount of insulation, the discharge process requires between about 5 hours to about 24 hours.

After completing the discharge, the magnesium anodes are reduced and have very little remaining material, thereby building up MgO at the bottom of the molten salt bath. Temperature sensors and bottom cooling apparatus is used to freeze out MgO approximately uniformly across the container and to control the temperature according to the intended discharge cycle. Discharging generates considerable heat which comes out mostly through the bottom, also through the sides, gas heat exchangers, and electrodes which may run for as long as 5 weeks (800 hours) for shipping and stationary storage.

The battery is moved to the recycling station, for example within a few hours. The top heat exchange apparatus, air supply connections, and terminals are removed. The Mg-steel-nickel battery electrodes from the molten salt electrolyte bath are also removed. Several smaller electrodes are inserted in the bath for multipolar magnesium oxide reduction. The multipolar electrolysis cell is run thereby producing oxygen bubbles at anodes and magnesium at cathode, while heating/dissolving MgO from the bottom. The dissolving process of MgO is expected to consume 20-50% before Mg anodes reach their maximum size. The electrodes are withdrawn, and new electrodes are inserted. If significant MgO is observed to be remaining in the bottom of the container, multiple smaller electrodes are again inserted in the bath and the process is repeated.

The magnesium ingots are reduced and recast as liquid magnesium anodes. The steel sheet connectors from nickel cathodes are reused as steel sheets for casting the magnesium anodes. The nickel cathodes and the air connections are also reused. If the battery is expected to remain for a period of time, the molten salt is removed and reused. Occasionally, for example, once per year, the container side insulation and the electrode braces are refurbished and if necessary, removed and replaced. Similarly, the bottom cooling control apparatus is serviced as needed.

What is claimed is:

1. A method for generating electricity in a metal-air battery, the method comprising:
   heating an anhydrous salt to obtain a molten salt electrolyte;
   contacting the molten salt electrolyte to at least one cathode submerged in a bath of the molten salt electrolyte;
   injecting air through pores in the cathode for communication with oxygen in the air;
   reducing oxygen from air at the cathode to obtain oxygen ions for diffusing into the molten salt electrolyte;
   oxidizing at least one metal anode by the oxygen ions in the electrolyte to obtain positive ions of the metal anode thereby generating electricity and forming a dissolved metal anode oxide; and
   cooling at least one section of the metal-air battery for precipitating the metal anode oxide.

2. The method according to claim 1 further comprising prior to pumping, drying air with at least one selected from: a dryer, a heat exchanger, and a dehumidifier.

3. The method according to claim 1 communicating further comprises controlling flow of air to the cathode.

4. The method according to claim 1 further comprising displacing the anode and the cathode for rotation in a parallel, off-vertical orientation to accommodate the metal anode oxide and direct oxygen bubbles.

5. The method according to claim 1 further comprising, insulating the battery.

6. The method according to claim 1 further comprising, connecting electric conductors to the cathode and the anode for harvesting electricity.

7. The method according to claim 1 further comprising regenerating the metal anode.

8. The method according to claim 7, regenerating the metal anode further comprises removing the cathode and the anode from the molten salt electrolyte, inserting at least one small electrode in the molten salt electrolyte for reducing multipolar metal oxide, and depositing metal on the electrode.

9. The method according to claim 1 further comprising, maintaining a temperature of the battery, wherein the temperature is more than a eutectic temperature of the molten salt electrolyte and is less than a melting temperature of the anode.

10. The method according to claim 1 further comprising, separating the anode and the cathode by insulating separators thereby maintaining distance between the anode and the cathode.

11. The method of claim 1 further comprising pumping the air though a channel or passage leading to the pores in the cathode for forming air bubbles in the molten salt electrolyte.

* * * * *